(12) United States Patent
Kruse

(10) Patent No.: US 7,003,142 B1
(45) Date of Patent: Feb. 21, 2006

(54) METHOD AND ARRANGEMENT FOR REGISTERING AND VERIFYING FINGERPRINT INFORMATION

(75) Inventor: Björn Kruse, Norrköping (SE)

(73) Assignee: Fingerprint Cards AB, Gothenborg (SE)

(*) Notice: Subject to any disclaimer, the term of this patent is extended or adjusted under 35 U.S.C. 154(b) by 564 days.

(21) Appl. No.: 10/069,240

(22) PCT Filed: Aug. 24, 2000

(86) PCT No.: PCT/SE00/01623

§ 371 (c)(1),
(2), (4) Date: Feb. 22, 2002

(87) PCT Pub. No.: WO01/15066

PCT Pub. Date: Mar. 1, 2001

(30) Foreign Application Priority Data

Aug. 24, 1999 (SE) .................................... 9902990

(51) Int. Cl.
*G06K 9/00* (2006.01)

(52) U.S. Cl. ............ 382/124; 382/125; 340/5.53; 340/5.83; 356/71

(58) Field of Classification Search ........ 382/124–127, 382/115–116; 340/5.53, 5.83; 356/71; 902/3; 713/186
See application file for complete search history.

(56) References Cited

U.S. PATENT DOCUMENTS 4,581,760 A * 4/1986 Schiller et al. ............. 382/124

5,067,162 A * 11/1991 Driscoll et al. ............. 382/126

(Continued)

FOREIGN PATENT DOCUMENTS

GB 2310522 A 8/1997

OTHER PUBLICATIONS

Wiebe et al., Precise Biomerics p. 33 (1998).

*Primary Examiner*—Bhavesh M. Mehta
*Assistant Examiner*—John Strege
(74) *Attorney, Agent, or Firm*—Birch, Stewart, Kolasch & Birch, LLP

(57) ABSTRACT

The invention relates to a method for registering fingerprint information via a sensing surface A. The method comprises scanning part surfaces $A'_1$ in the sensing surface A, checking whether the centre point $P_1$, with its immediate surrounding area $A''_1$, of each scanned part surface $A'_1$ is unique within the part surface $A'_1$, and registering a first number of centre points $P_1$ which, with their respective immediate surrounding areas $A''_1$, are unique within their respective part surfaces $A'_1$. The respective immediate surrounding areas $A''_1$ of the points and the respective part surfaces $A'_1$ of the points are also registered.

The invention also relates to a method for verifying fingerprint information, in which verification is carried out on the basis of registered information relating to a fingerprint which is to be approved in the verification method. The method comprises a number of part surfaces $A'_1$ with their respective centre points $P_1$ in the fingerprint whose information is registered being compared with corresponding part surfaces $A'_2$ on the sensing surface A. If there is a point $P_2$ on a part surface $A'_2$ on the sensing surface A which, with its immediate surrounding area $A''_2$, corresponds to the registered centre point $P_1$, including its immediate surrounding area $A''_1$ in the corresponding stored part surface $A'_1$, the point $P_2$ with its part surface $A'_2$ is approved. If a certain number of points $P_2$ with associated part surfaces $A'_2$ have been approved, these are selected for a first step in further processing.

8 Claims, 2 Drawing Sheets

U.S. PATENT DOCUMENTS

| | | |
|---|---|---|
| 5,140,642 A | 8/1992 | Hsu et al. |
| 5,239,590 A | 8/1993 | Yamamoto |
| 5,917,928 A * | 6/1999 | Shpuntov et al. ........... 382/124 |
| 5,982,913 A * | 11/1999 | Brumbley et al. ........... 382/124 |
| 6,241,288 B1 * | 6/2001 | Bergenek et al. ............. 283/67 |
| 6,314,196 B1 * | 11/2001 | Yamaguchi et al. ........ 382/125 |

* cited by examiner

METHOD AND ARRANGEMENT FOR REGISTERING AND VERIFYING FINGERPRINT INFORMATION

This application is the national phase under 35 U.S.C. § 371 of PCT International Application No. PCT/SE00/01623 which has an International filing date of Feb. 24, 2000, which designated the United States of America.

TECHNICAL FIELD

The present application relates to a method and an arrangement for registering and verifying fingerprint information.

BACKGROUND ART

There are a great many fields within which it is necessary to verify the identity of a person, in other words to answer the question of whether a certain person is who he claims to be and is thus authorized to use a certain type of equipment. Examples of such equipment are automatic cash dispensers, access systems and various types of electronic equipment, for example mobile telephones and computers.

A conventional manner of carrying out verification is for the user to have a code or a password which he has to input in a verification procedure. If the code is correct, the user is considered to be authorized to use the equipment. However, it can be difficult for a user to remember a large number of different codes and passwords, for which reason alternative ways of verifying the authority and/or identity of a user are necessary. One such alternative method is to have a user register information relating to one or more of his fingerprints in a verification unit, the user then, in a verification procedure, placing the finger or fingers whose print is registered against a surface on the verification unit. The unit analyses whether the fingerprint corresponds to the necessary degree to the fingerprint whose information is stored and, if so, the fingerprint is considered verified, and the user is permitted to use the equipment in question.

Identification by means of fingerprints has traditionally been used mostly within the field of crime prevention, where the question to be answered is not whether a fingerprint corresponds to another to the necessary degree. In that field, an attempt is instead made to establish a match with a specific fingerprint in an extensive register of fingerprints. This type of use of fingerprints does not involve the same great requirement for speed as a verification procedure of the type described above. Speed is also highly desirable in the registering of fingerprint information for use in verification.

Another important parameter, for both registering and verification of fingerprint information, is reliability.

DISCLOSURE OF INVENTION

The problem solved by the present invention is therefore that of providing an arrangement and a method affording rapid and reliable registering of fingerprint information, and of providing a corresponding arrangement and method for rapid and reliable verification of a fingerprint on the basis of previously registered fingerprint information.

This problem is solved by means of a method for registering fingerprint information via a sensing surface A, in which a finger can be held against or over at least a part of the sensing surface A, which method comprises scanning part surfaces in the sensing surface A. During scanning of the part surfaces, it is checked whether the centre point, with its immediate surrounding area, of each scanned part surface is unique within the part surface.

A number of centre points which, with their respective immediate surrounding areas, are unique in their respective part surfaces are registered, the respective immediate surrounding areas of the points and the respective part surfaces of the points also being registered.

A certain number of the registered centre points with their immediate surrounding areas are suitably selected for further use, for example for verifying fingerprints.

The abovementioned problem is also solved by means of a method for verifying fingerprint information via a sensing surface A, against or over at least a part of which sensing surface A a finger can be held, in which verification is carried out on the basis of previously registered information relating to at least one fingerprint which is to be approved in the verification method, and in which information has preferably been registered according to the registering method described above.

The verification method according to the invention comprises a number of part surfaces with their respective centre points in the fingerprint whose information is stored being compared with corresponding part surfaces on the sensing surface A. If there is a point on a part surface on the sensing surface A which, with its immediate surrounding area, corresponds, on the basis of certain criteria, to the stored centre point, including the immediate surrounding area of the stored centre point in the corresponding stored part surface, the point with its part surface is approved. If a certain number of points with associated part surfaces have been approved, these are selected for a first step in further processing.

This first step in further processing suitably comprises a number of the selected points and the part surfaces being analysed as a group, the mean value of the coordinates for the points in their respective part surfaces being calculated. The mean value calculated is seen as a point in each part surface, and a certain number of the points with their associated part surfaces are selected for a second step in further processing, the points which are selected being those points in the group which have the smallest distance to the mean value point in their respective part surface. This is done in order that an arrangement or a method according to the invention will be independent of translation of the print at the time of verification in relation to the position of the finger at the time of registering, translation being defined as right-angled displacements of the finger relative to the position of the finger at the time of registering.

The invention also comprises a method for making it possible to be independent of rotation of the finger at the time of verification in relation to the position of the finger at the time of registering. This method will be described in greater detail below.

The invention also comprises arrangements for use in the methods of the types mentioned above.

BRIEF DESCRIPTION OF DRAWINGS

The invention will be described in greater detail below with reference to the appended drawings, in which.

MODE(S) FOR CARRYING OUT THE INVENTION

Figure 1:
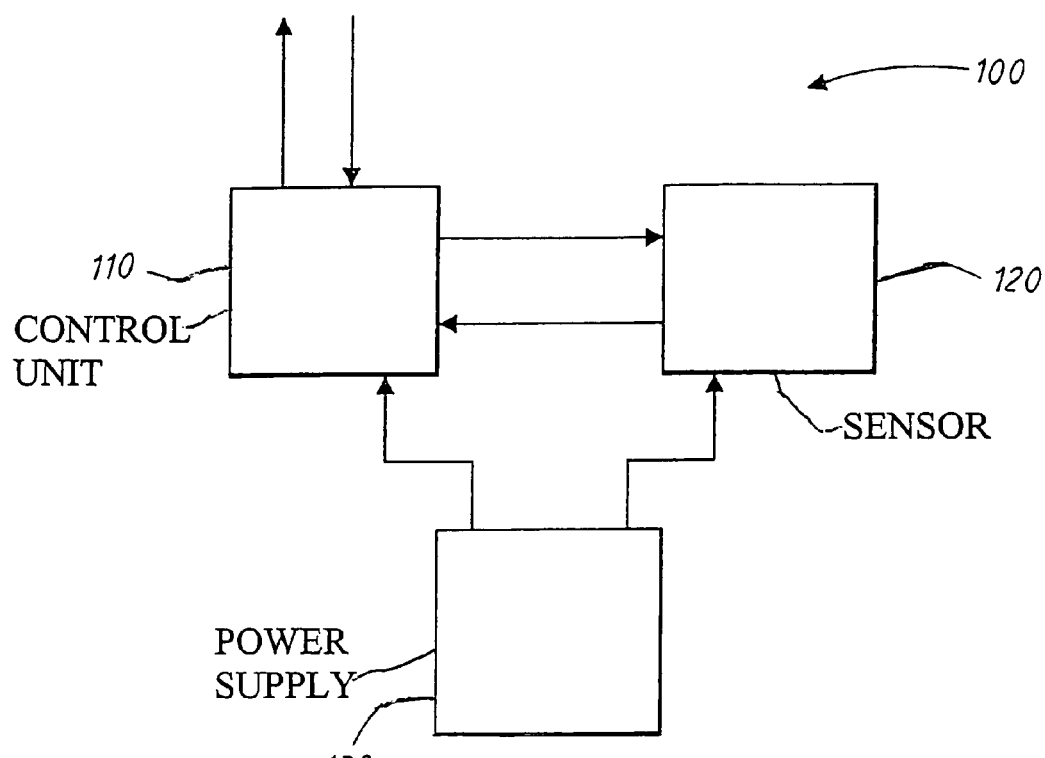
FIG. 1 shows a rough block diagram of an arrangement according to the invention.

FIG. 1 shows a rough block diagram of an arrangement 100 according to the invention. The arrangement 100 comprises a central unit 110, a sensor 120, a power supply unit 130, and connections, shown by arrows, between the units. The central unit 110 suitably comprises control arrangements, a memory and at least one arithmetic logic unit (ALU). The control arrangements and the ALU together preferably consist of an integrated circuit, for example a microprocessor.

The power supply unit 130 is not of major interest in terms of the invention and will therefore not be described in greater detail. In brief, it can be stated that the power supply can be effected in a great many ways known to the expert, for example batteries, mains connection or solar cells, and can be integrated in the same housing as the rest of the arrangement 100 or separate.

The sensor 120 has a sensing surface A, against or over at least a part of which sensing surface A a finger can be held during use of the arrangement. The sensor 120 comprises a number of sensor elements for scanning the sensing surface A. The sensor elements are preferably capacitive, but other types of sensor element can also be used according to the invention, for example resistive, optical or heat-sensitive elements. Another type of sensor which could be used in connection with the present invention is a pressure-sensitive sensor.

The number of sensor elements per unit area on the sensing surface A can be selected in a great many ways, depending on, for example, the type of sensor, and the desired speed, reliability and resolution. In a preferred embodiment of the invention, with capacitive sensor elements, roughly 200 sensor elements are used per $mm^2$, which corresponds to 144×144 points per $cm^2$, which on a length scale can be expressed as 14 elements per millimeter. This number is to be considered as only an example, however, and the number of sensor elements per unit area can be either larger or smaller in other embodiments of the invention. However, the number of sensor elements preferably lies within the range 10–50 elements per millimeter.

As mentioned above, the arrangement 100 is intended to be used for registering fingerprint information and for verifying fingerprint information on the basis of previously registered information relating to at least one fingerprint which is to be approved on verification. The previously registered information used for verifying fingerprints has preferably been registered by means of a method according to the invention.

Figure 2:
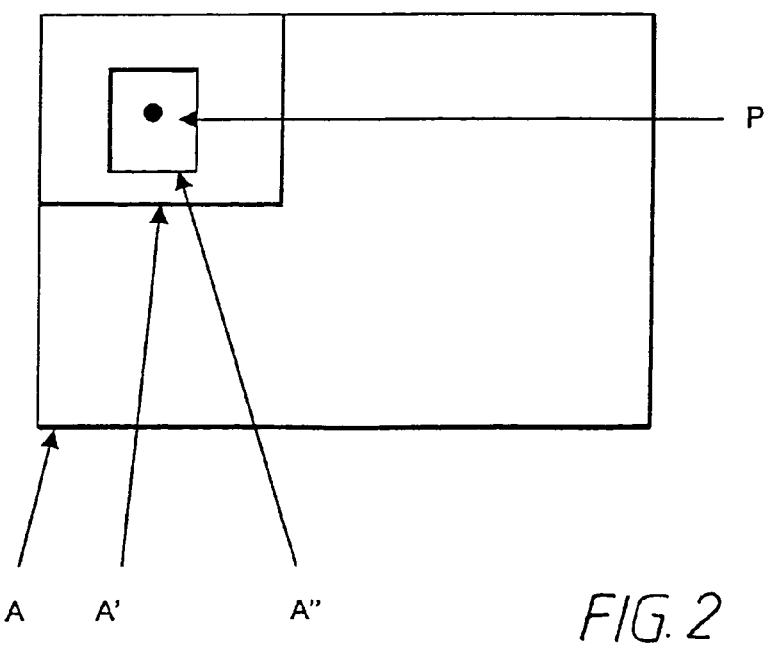
FIG. 2 shows a basic diagram of the use according to the invention of a part surface on a sensor.

Below, a method of registering fingerprint information according to the invention will be described first, and then a method for verifying fingerprint information according to the invention will be described. These methods are implemented by means of an arrangement according to the invention. Both the description of registering and the description of verification below will be given with reference to FIG. 2. None of the parts in FIG. 2 is provided with an index, but parts which have been provided with an index in the text refer to corresponding unindexed parts in FIG. 2.

In a method for registering fingerprint information according to the invention, the user places the finger whose information is to be registered against or over a part of the sensing surface A (shown in FIG. 2) on the sensor 120. The central unit 110 then initiates scanning of the sensing surface A of the sensor 120, which is carried out by part surfaces $A'_1$ on the sensing surface A being scanned. The part surfaces $A'_1$ preferably overlap one another in a predetermined manner. The part surfaces $A'_1$ are suitably all of the same size, which can of course be varied in a great many different ways. However, a suitable range for the size of the part surfaces $A'_1$ is 5–50% of the total sensor surface A, 10% of the total sensor surface having been found to be advantageous.

During scanning of the part surfaces $A'_1$, it is investigated, preferably in the central unit 110, whether the centre point $P_1$ of the part surface, with its immediate surrounding area $A''_1$, is unique within the part surface $A'_1$. If so, the point $P_1$ is approved and is registered together with its immediate surrounding area in the memory of the arrangement 100. The part surface $A'_1$ to which the centre point belongs is also registered.

Scanning of the sensor surface A preferably continues until the central unit 110 has found a certain predetermined first number of centre points $P_1$ which, including their immediate surrounding areas $A''_1$, are unique within their part surfaces $A'_1$. When the predetermined first number of centre points has been found and registered, registering of the finger is considered complete.

An alternative way of carrying out the scanning is to scan the part surfaces $A'_1$ in a given pattern, data on the centre points $P_1$ of all the part surfaces $A'_1$ being gathered and stored. When all the part surfaces $A'_1$ have been scanned, the central unit 110 selects a predetermined number of centre points $P_1$ which best meet certain criteria with regard to the requirement that the centre point $P_1$ is to be unique in its part surface $A'_1$.

A further alternative way of carrying out the scanning, which can save memory space, is to store the predetermined number of centre points $P_1$ in a table which is updated throughout the scanning process with the centre points which best meet the abovementioned criteria.

All the first number of stored centre points $P_1$ can of course be used for verifying a finger, but, in a particularly preferred embodiment of the invention, the central unit 110 selects a second number of the registered centre points with their respective immediate surrounding areas $A''_1$ for further use, the centre points $P_1$ which are selected being those which best meet certain predetermined criteria. The exact sizes of the first and the second number of centre points are of course dimensioning parameters which are determined by the desired speed and reliability of the registering method, but it has been found to be advantageous if the first number lies within the range 10–100 points, and the second number lies within the range 20–80% of the first number. In a particularly preferred embodiment, 24 and, respectively, 16 points are used.

A method for verifying fingerprint information according to the invention will be described below. The type of verification for which the invention is primarily intended is to check whether the fingerprint of a finger which is held against or over the sensing surface A of the sensor corresponds to a fingerprint whose information was registered previously.

For verifying a fingerprint according to the invention, the user therefore places a finger against or over a part of the sensing surface A on the sensor 120. The central unit 110 initiates scanning of the sensing surface A of the sensor 120, which is carried out by a number of part surfaces $A'_2$ on the sensing surface A being scanned. In terms of size and position on the sensing surface A, the scanned part surfaces $A'_2$ preferably correspond to the part surfaces used in the registering method described above, which means that each part surface $A'_1$ in the fingerprint data which is registered corresponds to a part surface $A'_2$ for verification. The part surfaces $A'_2$ which are analysed first in the verification method are those which correspond to the part surfaces $A'_1$ whose respective centre points $P_1$ are registered.

If, when a part surface $A'_2$ is scanned, it emerges that a point $P_2$ in the part surface $A'_2$, with its immediate surrounding area $A''_2$, has, on the basis of certain criteria, sufficient similarity to the centre point $P_1$ and its immediate surrounding area $A''_1$ in the corresponding registered part surface $A'_1$, the point $P_2$ is approved provisionally, and its coordinates in relation to the part surface $A'_2$ are stored in the memory of the arrangement 100. The coordinate system used is suitably an orthogonal x-y system in each part surface $A'_2$ with the origin in the centre of the part surface. If more than one point $P_2$ in a part surface $A'_2$ meets said criteria, the point $P_2$ which best meets the criteria is selected.

If a certain number of points $P_2$ have been approved and stored for the finger which is held against the sensing surface A, these points are selected for a first step in further processing.

Figure 3:
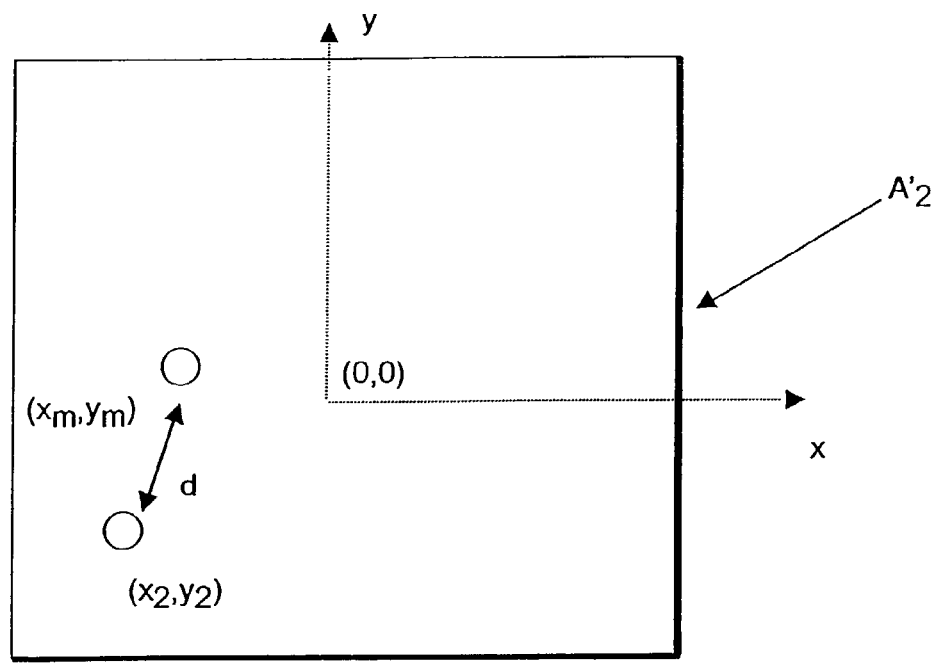
FIG. 3 shows the principle of a calculation according to the invention.

In a possible verification method, the first step in the further processing quite simply comprises the fingerprint being considered verified, in other words the fingerprint which is held against or over the sensing surface A is considered to be identical with the fingerprint whose information is registered, if the number of approved points $P_2$ exceeds a certain predetermined number. If greater reliability in verification is desired, however, the first step in the further processing can suitably also comprise the following, which is described with reference to FIG. 3.

The stored points $P_2$ are analysed as a group, and the mean value of the coordinates $(x_m, y_m)$ for all the points $P_2$ is calculated, analysis and calculation suitably being carried out in the central unit 110. The calculation therefore provides a coordinate pair $(x_m, y_m)$ which can be seen as a point in each part surface $A'_2$. The points $P_2$ in the group are then arranged in a list, starting from the absolute value of the distance d between the coordinates $(x_2, y_2)$ of a point and the calculated mean value point $(x_m, y_m)$. The distance d in a part surface $A'_2$ is illustrated diagrammatically in FIG. 3.

A certain number of the points highest on the list are then selected for a second step in further processing. If appropriate, this second step can quite simply comprise the fingerprint being considered verified, in other words the fingerprint which is held against or over the sensing surface A is considered to be identical with the fingerprint whose information is stored, if a sufficient number of points have an absolute value d below a certain value. If greater reliability in verification is desired, however, the second step in the further processing can suitably comprise the following:

The mean value of the coordinates $(x_2, y_2)$ of the selected points is calculated, and the absolute value of the distance between this mean value point and the coordinates $(x_2, y_2)$ of each selected point is analysed. If a certain number of points $P_2$ have a distance to the mean value point with an absolute value which is below a certain limit value, the fingerprint is considered verified, in other words the fingerprint which is held against or over the sensing surface A is considered to be identical with the fingerprint whose information is registered.

The numbers of points required in the various steps of the verification method are of course, in the same way as with the numbers in the registering method, dimensioning parameters which are selected on the basis of the combination of speed and reliability desired in the arrangement. By way of example, however, it may be mentioned that the number of points selected for a first step in further processing during verification can suitably correspond to the number of points selected in the final step of registering, in the present case, in other words, 16 points. The number of points selected for a second step in further processing in verification suitably lies within the range 20–60% of the number of points selected for the first step, preferably 50%, in the present case, therefore, 8 points.

Figure 4:
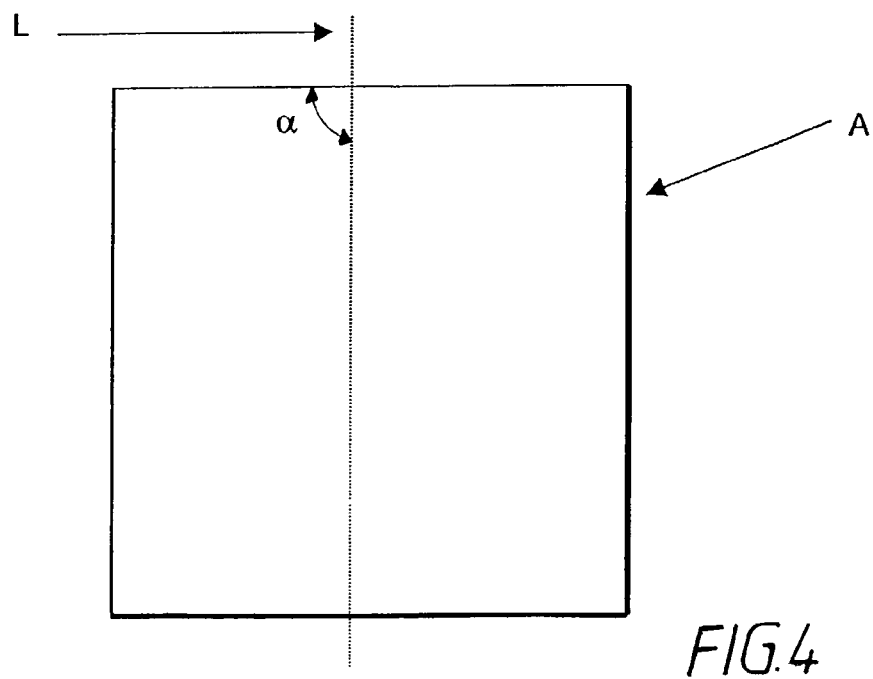
FIG. 4 shows how a verification method according to the invention can be made insensitive to rotation.

The verification method described above means that good results are obtained even if, during a verification procedure, a user holds his finger displaced at right angles in the lateral or longitudinal direction in relation to the position the finger was in at the time of registering. As the user may also, at the time of verification, hold his finger in a rotated position in relation to the position the finger was in at the time of registering, the invention comprises means and a method to make it possible to carry out verification with good results even in such cases. This will be described below with reference to FIG. 4.

In order that the verification will be insensitive to rotation of the finger, scanning and comparison are carried out according to the above description, in other words part surfaces $A'_2$ on the sensing surface are scanned. These part surfaces $A'_2$ are compared with corresponding part surfaces $A'_1$ in the registered fingerprint with regard to centre points and the immediate surrounding areas of the centre points. In order to achieve rotation-insensitivity, however, each part surface $A'_2$ is displaced into a number of different angular positions $\alpha$ around an imaginary vertical line L on the sensing surface A before it is compared with the corresponding part surface $A'_1$. Comparison is then carried out with the part surfaces $A'_2$ in each of these angular positions. If, in one and the same angular position, said number of points $P_2$ have sufficient similarity, on the basis of the abovementioned criteria, to their corresponding registered part surfaces $A'_1$, these centre points $P_2$ are selected for a first step in further processing, according to the description above.

In the same way as described above, the scanning over the sensing surface A of the sensor 120 is controlled by the central unit 110 of the arrangement 100 in the rotation-insensitive case also. The different angular positions $\alpha$ are achieved by information about the finger which is held against the sensing surface A being stored in the memory 110 of the arrangement in the angular position in which the user holds the finger, after which rotation of the stored information takes place before comparison is carried out.

The number of angular positions into which the part surfaces $A'_2$ are displaced can in principle be arbitrary, but the number of angular positions preferably lies within the range 10–100, and 16 angular positions can advantageously be used. The locations of the angular positions can in principle be selected freely, but, in a preferred embodiment, an odd number of angles $\alpha$ is selected around an imaginary centre line L on the sensing surface A, with one angular position which corresponds to $\alpha=0$, and an even number of angular positions of the same magnitude on each side of the centre line.

The invention is not limited to the embodiments described above but can be varied freely within the scope of the patent claims below.

What is claimed is:

1. A method for registering fingerprint information comprising:

providing a sensing surface A, at least a part of which receives a finger;

scanning part surfaces $A'_1$ in the sensing surface A;

determining whether the center point $P_1$, with an immediate surrounding area $A''_1$, of each scanned part surface $A'_1$ is unique within said part surface $A'_1$;

registering a first number of center points $P_1$ which, with their respective immediate surrounding areas $A''_1$ are unique in their respective part surfaces $A'_1$;

registering the respective immediate surrounding areas $A''_1$ of the registered center points and registering the respective part surfaces $A'_1$ of the registered points.

2. The method according to claim 1, further comprising selecting a certain second number of the registered centre points $P_1$, said second number being less than said first number, with their immediate surrounding areas $A''_1$, for further use.

3. A method for verifying fingerprint information, comprising:

providing a sensing surface A, at least a part of which receives a finger;

comparing a number of part surfaces $A'_1$ with their respective center points in a registered fingerprint with corresponding part surfaces $A'_2$ on said sensing surface A;

approving a point $P_2$ with its respective part surface $A'_2$ if the point and its immediate surrounding area $A''_2$ corresponds on the basis of certain criteria to a registered center point $P_1$, including its immediate surrounding area $A''_1$ in a corresponding stored part surface $A'_1$;

selecting for further processing a certain number of points $P_2$ with associated part surfaces $A'_2$ which have been approved;

displacing information about the part surfaces $A'_2$ for comparison with part surfaces $A'_1$ in a predetermined number of angular positions, said comparison being carried out with part surfaces $A'_2$ in each of said angular positions, so that if said certain number of points $P_2$ of part surfaces $A'_2$ satisfy said criteria in one in the same angular position, said points $P_2$ are selected for further processing;

said further processing of points $P_2$ with their respective part surfaces $A'_2$ includes analyzing the points and the part surfaces as follows:

calculating mean values of the coordinates (x,y) for points $P_2$ and their respective part surfaces $A'_2$;

considering the calculated mean values as a point in each part surface $A'_2$;

selecting a certain number of the points $P_2$ with their associated part surfaces $A'_2$ for a second further processing, said selected points having the smallest distance to the mean value point in their respective part surface $A'_2$.

4. The method for verifying fingerprints according to claim 3, wherein the step of second further processing of selected points $P_2$ with respective part surfaces $A_2$ comprises:

analysing a number of the selected points $P_2$ and their respective part surfaces $A_2$, including calculating the mean value of the coordinates (x,y) for the points $P_2$ in the part surfaces $A_2$, considering the calculated mean value as a point in each part surface $A_2$, analysing distance between the points $P_2$ in the group and the mean value; and verifying the fingerprint if the distance between the certain number of points $P_2$ and the mean value point is below a certain limit value.

5. An arrangement for registering fingerprint information comprising:

a central unit;

a sensor with a sensing surface A, at least a part of which receives a finger;

a power supply unit;

means for scanning part surfaces $A'_1$ in said sensing surface A;

means for analyzing whether a center point $P_1$ its immediate surrounding area $A'_1$, of the scanned part surface $A'_1$ is unique within the part surface $A'_1$;

means for registering a first number of center points $P_1$ which with their respective immediate surrounding areas $A''_1$ are unique in their respective part surfaces $A'_1$; and means for registering the part surfaces $A'_1$ whose center points $P_1$ are registered.

6. The arrangement according to claim 5, further comprising means for selecting a certain second number of the registered part surfaces $A'_1$ with associated centre points $P_1$ and immediate surrounding areas $A''_1$ for further use.

7. An arrangement for verifying fingerprints on the basis of previously registered information comprising:

a central unit;

a sensor having a sensing surface A, at least a part of which sensing surface A receives a finger;

a power supply unit;

means for comparing a number of part surfaces $A'_1$ with respective center points $P_1$ in a fingerprint whose information is registered with the corresponding part surfaces $A'_2$ on the sensing surface A;

means for selecting and approving a number of points $P_2$ with corresponding part surfaces $A'_2$ on the sensing surface A, when said points $P_2$ with their immediate surrounding areas $A''_2$, correspond on the basis of certain criteria to a storage center point $P_1$, including its immediate surrounding area $A''_1$ of the storage center point in the corresponding stored part surface $A'_1$;

means for further processing said approved points;

means for displacing information about the part surfaces $A'_2$ for comparison with the part surfaces $A'_1$ through a predetermined number of angular positions, said means for comparing carrying out a comparison in each of said angular positions, and said means for selecting and approving a number of points, approving said number of points $P_2$ of part surfaces $A'_2$ if said points satisfy said criteria in one and the same angular positions;

said means for further processing including:

means for analyzing a group of said approved points $P_2$ and part surfaces $A'_2$, means for calculating a mean value point for coordinates (x,y) of the points $P_2$ in the part surfaces $A'_2$ in the group, and means for selecting a certain number of said points $P_2$ where their associated parts $A'_2$ for a second further processing, said points $P_2$ which are selected being those points which have the smallest distance to the mean value point in their respective part surface $A'_2$.

8. The arrangement according to claim 4, further comprising:

means for carrying out said step of second further processing, including means for analysing a group of the points $P_2$ and the part surfaces $A_2$ selected for a second step, means for calculating a mean value point for the coordinates (x,y) of the points $P_2$ in the part surfaces $A_2$ in the group, means for calculating the distances between the points $P_2$ in the group and the mean value point, means for analysing whether the distance between a certain number of points $P_2$ and the mean value point is below a certain limit value, in which case the fingerprint is considered verified.

* * * * *